June 6, 1950 P. S. CLAUS 2,510,329
AUTOMATIC DRILL HEAD
Filed June 23, 1945 3 Sheets-Sheet 1
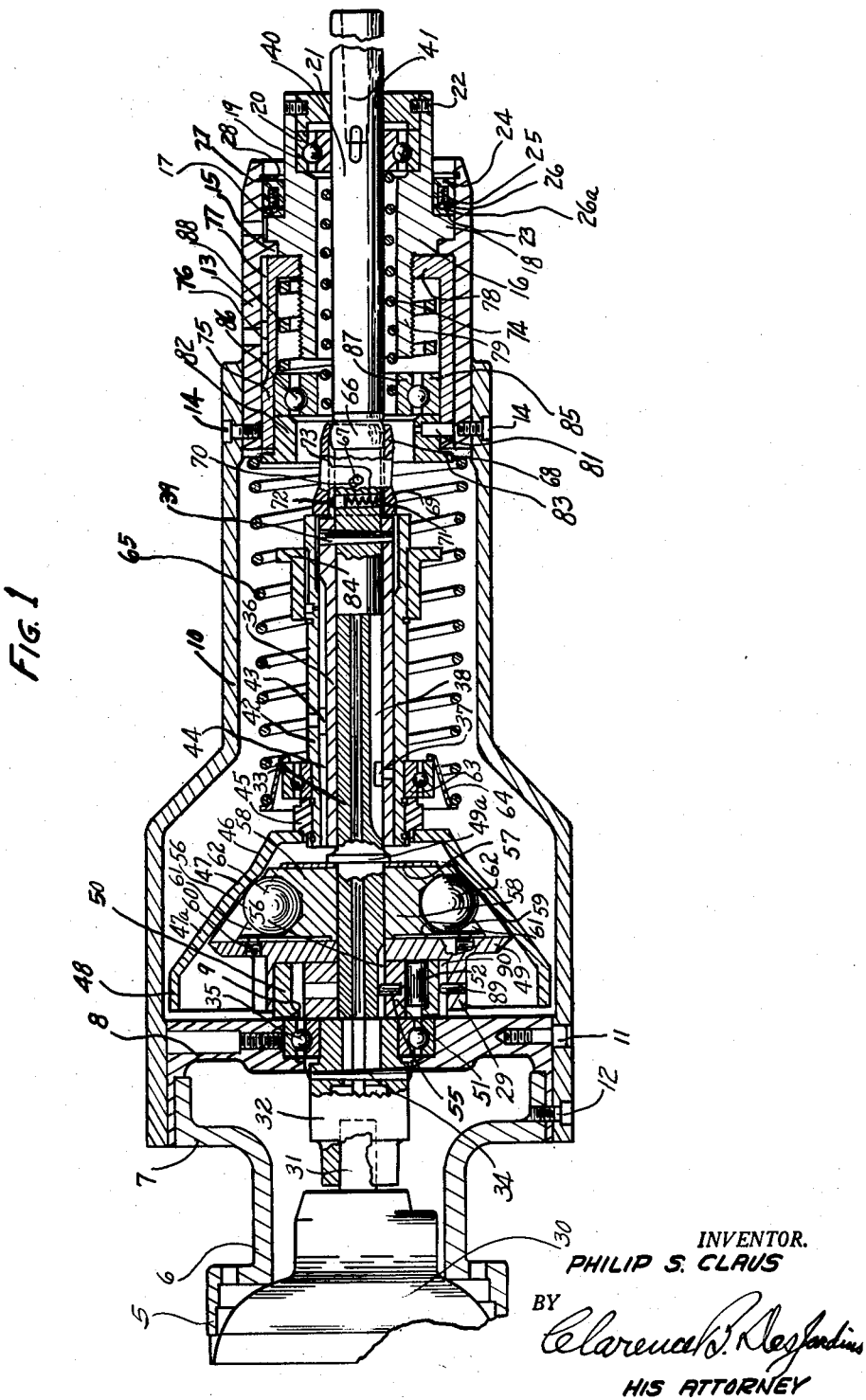
INVENTOR.
PHILIP S. CLAUS
BY
Clarence B. Desjardins
HIS ATTORNEY June 6, 1950
P. S. CLAUS
2,510,329
AUTOMATIC DRILL HEAD
Filed June 23, 1945
3 Sheets-Sheet 2
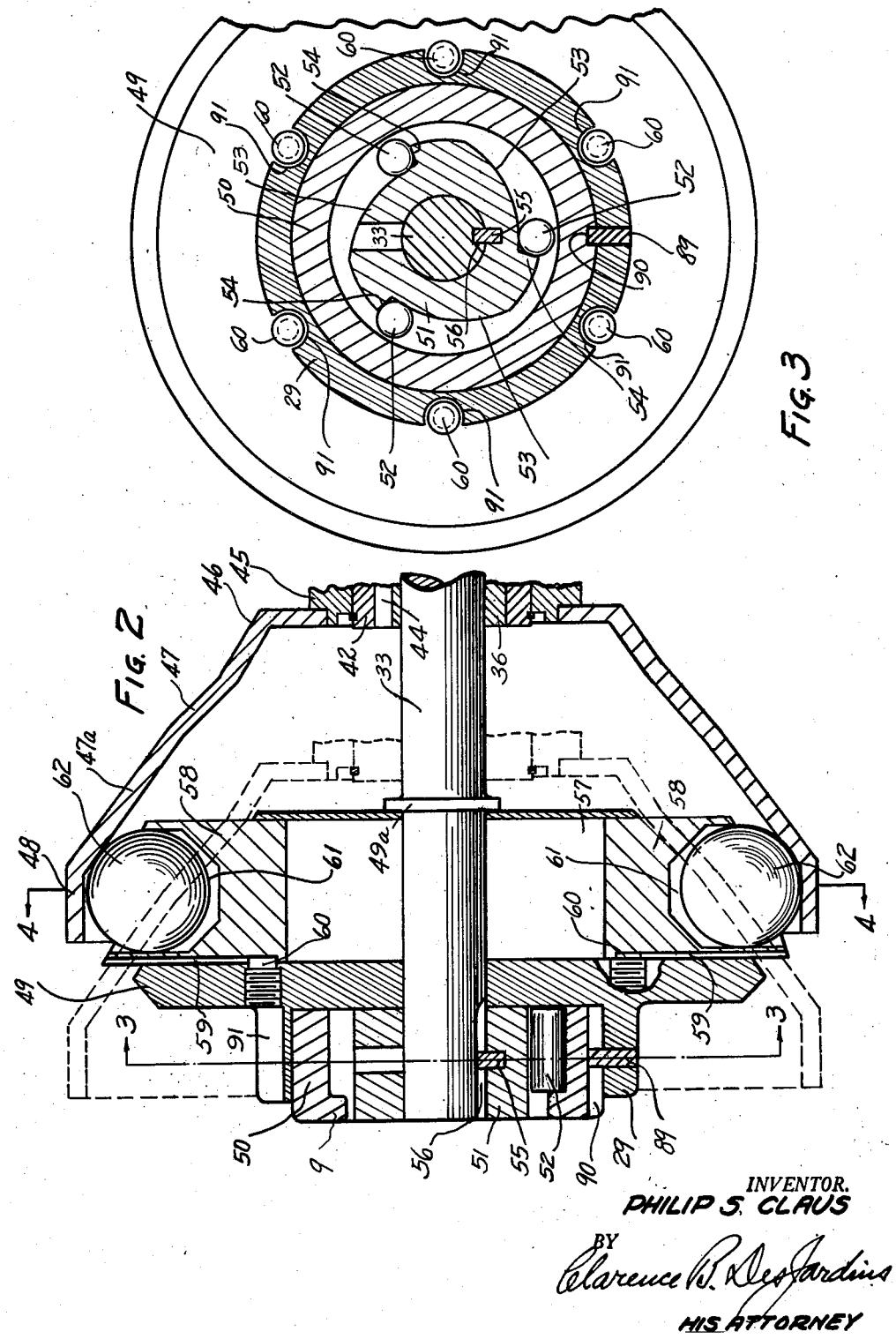
INVENTOR.
PHILIP S. CLAUS
BY
Clarence R. Desjardins
HIS ATTORNEY June 6, 1950 P. S. CLAUS 2,510,329
AUTOMATIC DRILL HEAD Filed June 23, 1945 3 Sheets-Sheet 3

INVENTOR.
PHILIP S. CLAUS
BY
Clarence B. DesJardins
HIS ATTORNEY

Patented June 6, 1950

UNITED STATES PATENT OFFICE 2,510,329

AUTOMATIC DRILL HEAD

Philip S. Claus, Plymouth, Mich., assignor to William A. King, Highland Park, Mich., trustee Application June 23, 1945, Serial No. 601,146

6 Claims. (Cl. 77—33)

My invention relates to improvements in automatic drill head and has to do, more particularly, with an improved automatic feeding mechanism for feeding a rotary cutter, such as a drill or reamer, toward the work.

One principal object of my invention is to provide, in an automatic drill head, improved means for automatically reducing the feeding pressure effective on the rotary drill or cutter, at a predetermined point in the feed thereof.

A further object of my invention is to provide, in an automatic drill head, improved means for automatically increasing the feeding pressure effective on the rotary drill or cutter, soon after the beginning of the feed thereof.

A further object of my invention is to provide improved means for automatically feeding toward the work the rotary drill or cutter of an automatic drill head, which will have the known advantages of spherical inertia members coupled with the advantage of using the largest inertia mass possible within the space limits of the tool.

Another principal object of my invention is to provide an automatic drill head having improved means of advancing or feeding automatically the rotary drill or cutter toward the work, of such nature that the braking effort required to bring the motor driven shaft and tool-carrying spindle to normal positions of rest will be reduced to a minimum.

A further object of my invention is to provide such automatic feeding mechanism so constructed that the mass of the rotating parts, whose momentum must be absorbed by the braking effort at the conclusion of the feed, is greatly reduced.

A further object of my invention is to provide an automatic feeding mechanism for automatic drill heads, in which it is not necessary to overcome the momentum of the inertia mass used to develop feeding pressure, to bring the driving motor, and the shafts and tool-carrying spindle driven thereby, to rest.

A further object of my invention is to provide, in an automatic drill head, an improved mechanism for automatically feeding the rotary drill or cutter toward the work so constructed as to speed up the operating cycle by reducing the time required to restore the parts to normal at the end of the feed.

Further objects, and objects relating to details and economies of construction and operation, will definitely appear from the detailed description to follow. In one instance, I have accomplished the objects of my invention by the devices and means disclosed in the following specification. My invention is distinctly pointed out in the appended claims. A structure, constituting a preferred embodiment of my invention, is shown in the accompanying drawings, forming a part of this specification, in which:

Fig. 1 is a longitudinal, sectional view through an automatic drill head embodying my invention.

Fig. 2 is an enlarged, sectional view, corresponding to a part of Fig. 1, showing the cage, sockets and balls with the frusto-conical pusher member in advanced position, this member being shown in normal position by dotted lines.

Fig. 3 is a detail, sectional view, taken on the line 3—3 of Fig. 2.

Figure 4:
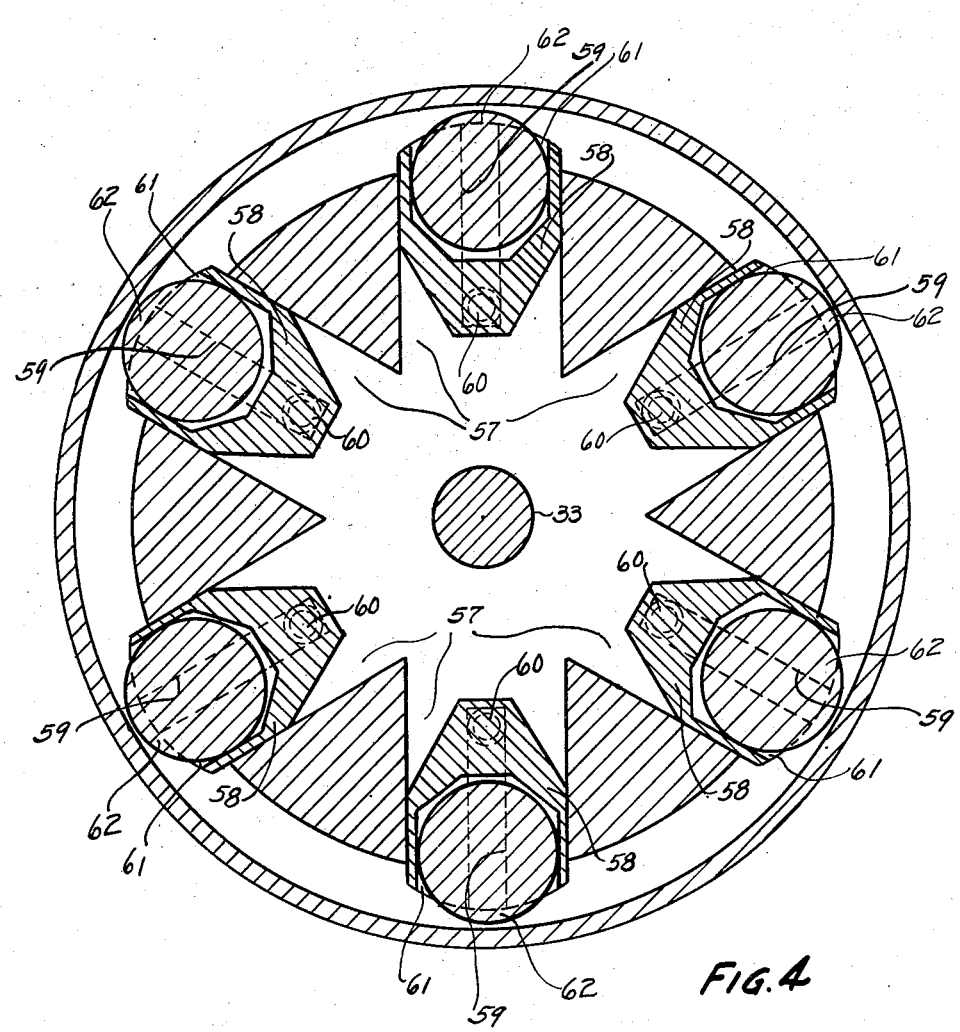
Fig. 4 is a detail, sectional view, taken on the line 4—4 of Fig. 2.

In the drawings, the same reference numerals refer to the same parts throughout the several views, and the sectional views are taken looking in the direction of the arrows at the ends of the section lines. This invention is an improvement on the invention disclosed in the co-pending application of Philip S. Claus and Eber J. Readman, Serial No. 582,646 now U. S. Patent No. 2,421,541, issued June 3, 1947. One feature of my present invention consists in the use of inertia masses, for developing feeding pressure to advance the rotary tool toward the work, which comprise a plurality of holders, mounted in a revoluble retainer driven by the driving shaft, and movable outwardly thereof; and a plurality of inertia members carried by these holders and movable outwardly therein. The inertia members engage a frusto-conical pusher member, which is connected to the driven shaft or spindle so that the pressure exerted on the pusher member by the inertia members and holders, upon rotation of the retainer, is transmitted to the driven shaft to move it axially. The retainer may take the form of a cage and the holders may be sockets slidably mounted in the cage and receiving balls that constitute the inertia members. The holders or sockets, and the inertia members which preferably are rolling members such as balls, may be so guided as to move radially of the driving shaft. Means may be provided for limiting the outward movement of the holders in the retainer so that, when the holders reach their outer limit of movement, the inertia members may move out of thrust relationship therewith, thus reducing the inertia mass effective to develop feeding pressure.

Another feature of my present invention consists in providing a one-way driving connection, or overrunning clutch connection, between the driving shaft and the retainer or cage for the inertia members or balls, so that, when the motor drives the shaft, the retainer will be driven thereby, but, when the motor ceases to drive the shaft, the connection will be ineffective and the retainer and inertia mass, rotating due to momentum, will not drive the shaft. This feature permits of speeding up the operating cycle since less time is required to restore the parts to normal at the end of the feed, and it will take less braking effort to bring the motor, shafts and spindle to rest.

Referring to the numbered parts of the drawings, an improved automatic drill head embodying this invention is provided with a casing which includes a rear member 5 for mounting the motor, having a forwardly-extending cylindrical part 6, provided with a radial flange 7. The main portion of the casing consists of cylindrical member 10, which has a rear portion of greater diameter than its forward portion, and which seats against the bearing support 8 and is secured thereto and to the flange 7, by screws 11 and 12. The forward portion of the casing is formed by a cylinder 13, which fits within the forward portion of cylinder 10 and is secured thereto by screws 14. The cylinder 13 is provided with an internal annular flange 15. A rotatable adjusting member 16 has an annular shoulder 17, and an annular flange 18, and the adjustable member 16 fits within the forward end of cylinder 13 with the shoulder 17 adapted to engage the inner face of flange 15, and the flange 18 engaging the front face of said flange 15. A ball bearing 20 is seated in the forward portion of the adjusting member 16, in a seat 19, and the spindle 40 is journaled in said ball bearing. A retaining member 21 fits within the forward end of adjusting member 16 and is secured thereto by screws 22, and this retaining member engages the ball bearing 20 and holds it in its seat 19. A ring 23 is mounted within the casing member 13 and engages the forward face of flange 18 on the adjusting member 16. A ring 24 is seated within the forward end of the casing member 13 and held in position by a split ring 28, seated in a groove 27 in the casing member. The ring 24 has a plurality of symmetrically arranged sockets 25, in each of which a spring 26 and ball 26a are seated, said balls engaging the forward face of ring 23 and pushing it toward the flange 18.

An electric motor 30 is mounted in the casing member 5, and the armature shaft 31 of the motor is connected through a coupling 32 to the driving shaft 33 by the transverse taper pin 34. The shaft 33 is journaled in the bearing support 8, a little in front of the point at which it enters the hub of the coupling member 32, by the ball bearing 35, mounted in said bearing support 8. The sleeve 36 is mounted on shaft 33 and a stud 37, carried by said sleeve, engages in a longitudinal groove 38 in the shaft. The forward end of sleeve 36 is connected by the transverse taper pin 39 to the rear end of the spindle 40, which extends within the sleeve. Thus, the driven shaft or spindle 40 is coaxial with the driving shaft 33 and rotatable with said shaft, but movable longitudinally thereof. The front end of the spindle 40 is provided with a socket 41, adapted to receive the shank of a rotary cutter.

To automatically advance the spindle 40 as the shaft 33 rotates, together with said spindle, a feed sleeve 42 is provided, coaxial with shaft 33 and mounted upon the outside of sleeve 36. A stud 43, carried by the feed sleeve 42, engages in a longitudinal groove 44 formed in sleeve 36, so that the sleeve rotates with the driving shaft 33 but is movable longitudinally with respect thereto. A ring 45, secured to the rear end of sleeve 42, has secured thereto a frusto-conical pusher member, including the forward portion 46, the intermediate portions 47 and 47a, the intermediate portion 47 being of greater slope than the forward portion 46, and the intermediate portion 47a of the same slope as the forward portion 46, and the rear cylindrical portion 48. The retainer or cage 49 is revolubly mounted on the shaft 33 and its forward face engages shoulder 49a on said shaft. Also mounted on the shaft 33 is an overrunning clutch or one-way driving connection consisting of an outer member 50, an inner drive member 51, and interposed rollers 52, which are adapted to be engaged by the cam surfaces 53 of the drive member, and said rollers upon rotation of the drive member become wedged between the inner and outer members of the clutch. The rollers are permitted slight radial movement in the neutral position, when each lies adjacent a stop 54 at the base of cam surface 53. A key 55, carried by the drive member 51, engages in a longitudinal groove 56 formed in the shaft 33, so that said drive member is keyed to the shaft. The outer member 50 of the clutch has an inwardly-extending flange 9 at its rear end, which prevents rearward movement of rollers 52. Cage 49 has a rearwardly-extending cylindrical flange 29, coaxial with shaft 33, within which the overrunning clutch is housed. A key 89 carried by flange 29 fits in keyway 90 in the outer portion of outer member 50, to fix the latter in said annular flange.

The cage 49 is provided with a plurality of radial bores 57, symmetrically arranged about the axis of shaft 33. The bores 57, have mounted therein sockets 58, which substantially fill said bores and are provided on their rear faces with longitudinal grooves 59, which receive stop screws 60 carried by cage 49 and limiting the outward movements of the sockets with respect to the cage. Notches 91 are provided in the exterior of flange 29 to provide access to the heads of stop screws 60 for insertion or removal thereof. The sockets 58 are provided with recesses 61 in their outer ends, which receive the centrifugal balls 62. The cage 49, sockets 58 and balls 62 are housed within the frusto-conical pusher member and, when the shaft 33 is at rest, the balls engage the steeper portion 47 of said pusher member.

When shaft 33 starts rotation, balls 62 engage the steeper portion 47 of the pusher member and consequently a larger proportion of the centrifugal force exerted by the balls 62 is effective to move the pusher member and feed sleeve 42 axially, to start the tool feed. At the start of the feed, however, friction between sockets 58 and the walls of bores 57 may hold back the sockets momentarily so that the balls move outwardly in recesses 61 and only the mass of balls 62 is effective to develop centrifugal force transmitted to the pusher member. Centrifugal force acting on the sockets 58 soon overcomes any frictional resistance, and said sockets move outwardly into thrust relationship with balls 62, so that the mass of both sockets and balls is effective to develop centrifugal force exerted on the pusher member. Early in the feed of the tool the balls 62 pass from engagement with the steeper portion 47 to engagement with the less steep portion 47a of the pusher member, whereby the proportion of the centrifugal force, effective to move the pusher member axially, is reduced. At a predetermined point in the feed of the pusher member, feed sleeve and tool, preferably near the end of the feed, stop pins 60 engage the inner ends of grooves 59, so that further outward movement of the sockets is prevented and, thereafter, the only centrifugal force effective to feed the tool is that due to balls 62, alone. Thus, the pressure developed by centrifugal force and exerted on the pusher member to feed the tool is reduced at a predetermined point in the feed.

The inner race of a ball bearing 63 is mounted on the sleeve 42, in front of the ring 45, and a spring seat 64 is mounted on the outer race of the ball bearing. A coiled compression spring 65 is interposed between the spring seat 64 and the rear end of the cylindrical casing member 13. This spring yieldingly opposes the advance of the feed sleeve 42 as the shaft rotates and, when the shaft is brought to rest, this spring returns the feed sleeve 42 and pusher member to the normal position, shown in Fig. 1.

A spherical portion 66 is formed on the spindle 40, at the rear end thereof, and a transverse pin 67 extends through the spindle, a short distance in the rear of this ball portion. A collet sleeve 68 is mounted on the spindle, surrounding it, with the interior of the forward portion of the sleeve in engagement with the ball portion 66 of the spindle and with the ends of the transverse pin 67 projecting into inclined slots 70 in the collet sleeve 68, diametrically opposite each other. On the rear portion of the collet sleeve 68, there is formed an external frusto-conical shoulder 69. A transverse socket 71 is formed in the spindle, in the rear of the pin 67, and this socket houses a plunger 72, which engages the inside of the rear portion of the collet sleeve and is pressed upwardly against the sleeve by the spring 73 housed in the socket. This spring-pressed plunger 72 normally rocks the collet about its pivotal mounting on the spindle, so that the axis of the collet sleeve 68 extends at an angle to the axis of the shaft 33 and spindle 40, and, under such conditions, the rear end of the collet sleeve projects into the path of the feed sleeve 42, so that, as the feed sleeve is automatically advanced upon rotation of the shaft, the cocked collet sleeve transmits this feeding motion to the spindle 40. When the collet sleeve is rocked, so as to bring its axis into alignment with the axis of shaft 33 and spindle 40, the collet sleeve 68 and spindle 40 will be retracted, to withdraw the tool from the work, the collet passing within the forward end of the feed sleeve 42. This is brought about by the coiled compression spring 74, interposed between the forward end of the collet sleeve 68 and the inner race of the ball bearing 20, which spring yieldingly opposes the advance of the spindle and pulls it away from the work as soon as the collet sleeve 68 is tilted from the cocked position into concentricity with the feed sleeve 42. The inclination of the slots 70 is such that the rocking of the collet sleeve 68, from its cocked to its concentric position, causes a slight relative movement of the spindle 40 and the collet sleeve 68 to retract the spindle slightly at the instant of discontinuance of the spindle feed. Thereafter, the spindle is completely retracted by the pressure of spring 74.

A brake sleeve 75 is mounted within the cylindrical casing member 13 and held against rotation with respect thereto, while permitting longitudinal movement, by means of a key 76 carried by casing member 13 and engaging in the longitudinal groove 77 formed in the outer surface of the brake sleeve. The forward end of said brake sleeve has an inwardly extending annular flange 78, which is internally threaded and engages the externally threaded portion 79 of the rotatable adjusting member 16. Upon rotating the adjusting member 16, the brake sleeve 75 will be held against rotation with respect to the casing, and will therefore be adjusted longitudinally of the casing 13. The rear portion of the brake sleeve 75 carries a brake ring 82 fixed thereto by pins 81. This brake ring 82 has an outwardly extending annular flange 83, adapted to be engaged by a brake flange 84 fixed to the feed sleeve 42.

The outer race 85 of a ball bearing is mounted within the brake sleeve 75, in engagement with the front face of the brake ring 82. Balls 86 of the bearing are interposed between the outer race 85 and the inner race 87, which surrounds the spindle 40 and is coaxial with shaft 33 and spindle 40. A coiled compression spring 88 is interposed between the outer race 85 of this ball bearing and the rear face of the flange 78, and yieldingly holds the bearing race 85 against the front face of brake ring 82. Thus, by rotating the adjusting member 16, the brake sleeve 75 will be adjusted longitudinally of the casing member 13 and the inner race 85 of the ball bearing and the brake ring 82 will be positioned accurately, to cause the spindle feed to be discontinued at a predetermined point. As the spindle 40 is advanced, the forward end of the collet 68 will enter the annular race 87 and, when the frusto-conical portion 69 of the collet engages the annular race 87, the collet 68 will be rocked into concentric relation with the axis of shaft 33 and spindle 40 to discontinue the spindle feed.

Fig. 1 illustrates the positions occupied by the parts of this mechanism, when the power is cut off from the motor 30 and the driving shaft 33 is at rest. The collet 68 is cocked, so as to project a portion of the rear end thereof in the path of advance of the feed sleeve 42. When the switch is closed, to supply current to the motor 30, shaft 33 is driven, thus causing the drive member 51 fixed to shaft 33 to be rotated and the rollers 52 to become wedged between the cam surfaces 53 of drive member 51 and the outer member 50 of the overrunning clutch mechanism, and causing the revoluble cage 49 to rotate. As the shaft 33 rotates, the balls 62 and sockets 58 exert centrifugal force on the pusher member to advance the feed sleeve 42. Thus, the feed sleeve 42 is advanced automatically, as the shaft rotates, against the yielding pressure of spring 65. The advance of the feed sleeve 42, through collet 68, causes the spindle to advance. When the spindle 40 is advanced to the predetermined position, the frusto-conical portion 69 of the collet 68 engages the inner race 87 of the ball bearing to rock the collet 68 on its pivotal mounting on the spindle 40, to bring it into concentric relation with the axis of shaft 33. As soon as the collet becomes concentric with the axis of shaft 33, compressed spring 74 becomes effective to withdraw the spindle and move the collet 68 rearwardly into the forward end of the feed sleeve 42. The advance of the feed sleeve 42 will have brought the brake flange 84 into engagement with the brake ring 82, which tends to bring the shaft 33 and the parts driven thereby to rest. When the circuit to the motor is automatically opened at this point, the stopping of the motor drive will result in the rollers 52 becoming disengaged from the outer member 50 of the overrunning clutch so that the drive of the revoluble cage is disconnected. The braking effort of brake flange 84 against brake ring 82, therefore, does not have to overcome the momentum of cage 49, sockets 58 and balls 62, to bring the motor 30, shaft 33, feed sleeve 42 and spindle 40 to rest, and the operating cycle is shortened. The momentum of cage 49, sockets 58 and balls 62 is absorbed, when the drive is disconnected, by the spring 65, which returns the frusto-conical pusher member to its normal position. As the feeding pressure is withdrawn from the feed sleeve 42 by the return of the frusto-conical pusher member, the feeding sleeve is likewise returned to the normal position by the spring 65. As it returns to normal position, the forward end of feed sleeve 42 moves to the rear of the rear end of the collet 68, whereupon spring 73 becomes effective to cock the collet into the position shown in Fig. 1 and the automatic feeding mechanism is in a position for subsequent cycling operations.

I am aware that the feeding mechanism for rotary cutters described herein is susceptible of considerable variation without departing from the spirit of my invention and, therefore, I claim my invention broadly, as indicated by the appended claims.

Having thus described my invention, what I claim as new and useful, and desire to secure by Letters Patent, is:

1. In a centrifugal feed mechanism for rotary cutters including a driving shaft, a driven shaft, and means for driving the driven shaft from the driving shaft, means for automatically moving said driven shaft axially comprising the combination of a revoluble retainer driven by said driving shaft, a frusto-conical pusher member, a connection between said pusher member and said driven shaft whereby pressure exerted on said pusher member, upon rotation of said retainer, is transmitted to the driven shaft, a plurality of holders mounted in said retainer and movable radially outwardly and inwardly thereof in respect to the driving shaft, and rolling members carried by said holders and movable radially outwardly and inwardly thereof in respect to the driving shaft and the holders for exerting pressure on the pusher member to move the driven shaft axially, said rolling members and holders being permitted simultaneously to act as inertia masses to exert centrifugal force on the pusher member for an intermediate range of the axial movement of said pusher member.

2. In a centrifugal feed mechanism for rotary cutters, the combination set forth in claim 1 in which means is provided at a predetermined point at the end of axial movement of the pusher member to prevent the holders from exerting any centrifugal force upon the pusher member.

3. In a centrifugal feed mechanism for rotary cutters including a driving shaft, a driven shaft, and means for driving the driven shaft from the driving shaft, means for automatically moving said driven shaft axially comprising the combination of a revoluble retainer driven by said driving shaft, a frusto-conical pusher member, a connection between said pusher member and said driven shaft whereby pressure exerted on said pusher member, upon rotation of said retainer, is transmitted to the driven shaft, a plurality of holders, each provided with a socket, slidably mounted in said retainer to move radially inwardly and outwardly thereof with respect to the driving shaft, a rolling member carried in each of the sockets of the holders and movable radially outwardly and inwardly thereof with respect to the driving shaft and the holders for exerting pressure, in mass with the holders, on the pusher member to move the driven shaft axially, and engaging means between the retainer and each of the holders for limiting the outwardly radial movement of the holders at a predetermined point to permit the rolling members only exerting pressure on the pusher member, thereby reducing the centrifugal force exerted upon said pusher member toward the close of the axial movement of the driven shaft.

4. In a centrifugal feed for rotary cutters, the combination set forth in claim 3 in which the limiting means for the holders are pins on the retainer engaging notches in the holders.

5. In a centrifugal feed mechanism for rotary cutters, including a driving shaft, a driven shaft, and means for driving the driven shaft from the driving shaft, means automatically moving said driven shaft axially comprising the combination of a revoluble retainer driven by said driving shaft, a frusto-conical pusher member, a connection between said pusher member and said driven shaft whereby pressure exerted on said pusher member, upon rotation of said retainer, is transmitted to the driven shaft to move it axially, a plurality of holders mounted in said retainer and movable radially outwardly and inwardly thereof with respect to the driving shaft, rolling members carried by the holders and movable radially outwardly and inwardly relatively to said holders and the driving shaft for exerting pressure, in mass with the holders, on the pusher member to move the driving shaft axially, and means for limiting the outwardly radial movement of the holders in respect to the outward movement of the rolling members for reducing the pressure exerted upon the pusher member beyond a predetermined point in feeding direction.

6. In a centrifugal feed mechanism for rotary cutters, including a driving shaft, a driven shaft, and means for driving the driven shaft from the driving shaft, means automatically moving said driven shaft axially comprising the combination of a revoluble retainer driven by said driving shaft, a frusto-conical pusher member, connection between said pusher member and said driven shaft whereby pressure exerted on said pusher member, upon rotation of said retainer, is transmitted to the driven shaft to move it axially, a plurality of holders mounted in said retainer and movable radially outwardly and inwardly thereof with respect to the driving shaft, rolling members carried by the holders and movable radially outwardly and inwardly with respect to said holders and the driving shaft for exerting pressure, in mass with the holders, on the pusher member to move the driving shaft axially, means for retarding the initial outward radial movement of the holders for reducing initial pressure upon the pusher member, and means for limiting the outward radial movement of the holders in respect to the outward movement of the rolling members for reducing the pressure exerted upon the pusher member beyond a predetermined point in feeding direction.

PHILIP S. CLAUS.

REFERENCES CITED

The following references are of record in the file of this patent:

UNITED STATES PATENTS

| Number | Name | Date |
|---|---|---|
| 1,703,061 | Coleman | Feb. 19, 1929 |
| 2,034,988 | Nilsson et al. | Mar. 24, 1936 |
| 2,038,450 | Roesch | Apr. 21, 1936 |
| 2,346,359 | Claus | Apr. 11, 1944 |
| 2,375,639 | Falk | May 8, 1945 |